Patented Feb. 7, 1928.

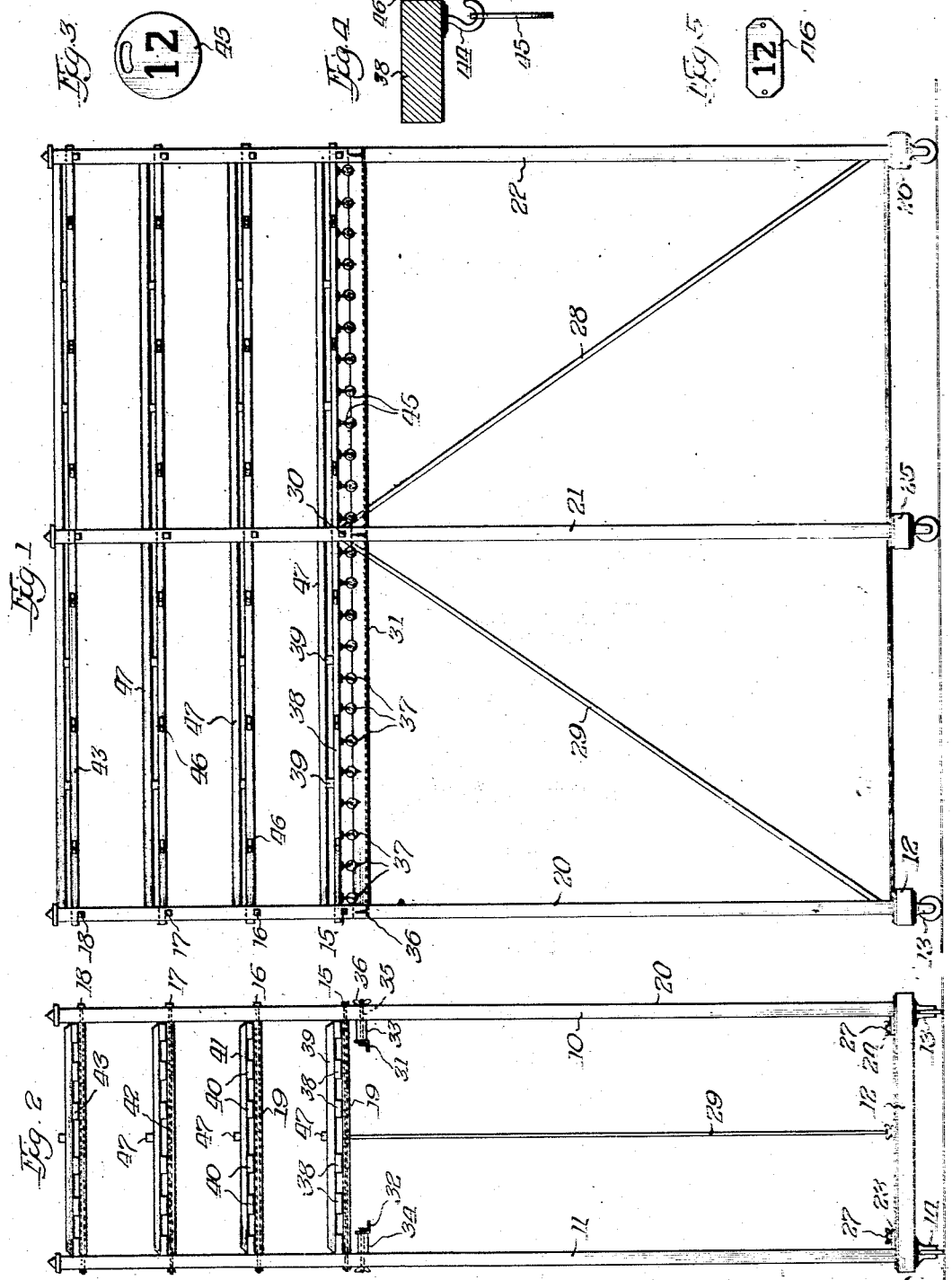

1,658,252

UNITED STATES PATENT OFFICE.

GEORGE PETERSON, OF CHICAGO, ILLINOIS.

COMBINED COAT AND HAT RACK.

Application filed August 22, 1925. Serial No. 51,749.

My invention relates to combined coat and hat racks and has for its primary object a provision of a coat and hat rack for use in hotels, clubs and the like, where coats and hats are checked, and comprises means whereby coats and hats are placed upon the rack in such positions that one check given to the customer identifies the coat and hat, and furthermore providing hat spaces which correspond to numbered spaces upon the rack so that it is impossible for the checker to make errors in passing out the coats and hats; and also assisting the checker in quickly removing the checks from the rack.

A further object of my invention is a provision of a combined coat and hat rack adapted for use in hotels and the like, which is portable and which is adapted to be easily moved from one place to another to meet the requirements of hotels where various rooms are used for dining and checking purposes.

A further object of my invention is a provision of a combined coat and hat rack which is capable of being shipped or stored in knock-down condition, and which can be set up without the use of particular tools or a great deal of labor, thus effecting a saving in freight rates, and which, futhermore, can be knocked down for storage purposes and placed away in compact manner without occupying a great deal of space.

Another further object of my invention is a provision of a combined coat and hat rack which is simple in construction, which is easily and cheaply manufactured, and which provides a combined portable coat and hat rack, thus avoiding the necessity of checking the hats in one place and coats in another.

These and other objects of my invention will be more fully and better understood by reference to the accompanying drawings, and in which:—

Figure 1 is a side elevational view of my improved construction;

Figure 2 is an end elevational view of the device shown in Figure 1, and particularly in detail illustrating one of the units making up the rack;

Figure 3 is an elevational view of one of the customers' checks;

Figure 4 is a detailed view, partially in section and partially in elevation, showing how the identifying and customers' checks are each secured to the rack; and Figure 5 is a detailed view of one of the permanent numbers applied to the rack.

Referring now specifically to the drawings, and in which reference characters refer to like parts throughout; and particularly to Figure 2, which is an end elevational view of the rack and in which one of the units used to make up the complete structure is shown: a pair of posts 10 and 11 are provided, which are connected at their bottom ends by a cross member 12 to which a pair of casters 13 and 14 are applied in the usual manner. The posts at their upper ends are held together by four cross rods 15, 16, 17 and 18 in spaced relation with each other, each of said rods having small pipes 19, 19 through which the said rods extend and which act as spacers between the posts 10 and 11, these rods and the spacers, together with the posts and base heretofore described, forming a unit which with two other like units form the frame for my improved coat and hat rack when they are knocked down for shipping and storage purposes.

Referring now particularly to Figure 1, a plurality of units 20, 21 and 22, such as I have heretofore described, is provided, and which are placed in spaced relation with each other, with a pair of longitudinally extending bars 23 and 24 which are secured to the bases 12, 25 and 26 by means of bolts having nuts 27, 27, these members 23 and 24 serving to brace and hold the units at the bottom. A pair of angularly disposed brace rods 28 and 29 are provided, which are secured at their lower ends to the base members 12 and 26 and and at their upper ends are secured to a rod 30 corresponding to the rod 15 heretofore described. The units 20, 21 and 22 are placed in spaced relation with each other and have on each side thereof longitudinally extending angle bars 31 and 32 having spacing blocks 33 and 34 provided, by means of which the angle bars are spaced from the posts 10 and 11, the angle bars being held in position by means of bolts 35 having thumb screws 36 thereon, the said angle bars 31 extending for the full length from the unit 20 to the unit 22 and having on the upper sides thereof a plurality of notches 37, 37, within which coat hangers are positioned when the device is in use.

Extending longitudinally of the rack and supported by the rods 15 is a hat shelf composed of a plurality of spaced members 38, 38, having bars 39, 39 extending thereacross at intervals, so that each of the shelves between the units 20 and 21 is divided into three spaces, for receiving three hats placed upon each shelf between these units. Spaced above the lower hat shelf is an intermediate hat shelf composed of longitudinally extending members 40, 40 having cross members 41 there-across, the said members 40 being supported by the pipes 19 carried by the rod 16, these spaces also being divided in the same manner as heretofore described. Another pair of hat shelves are provided which are supported by the rods 17 and 18, these shelves being constructed and divided in exactly the same manner as has been described heretofore. It will thus be understood that between each of the units 20 and 21 there is provided upon one side of the rack spaces for twelve hats and also twelve coats upon the racks 32, and at the opposite side thereof space is provided for an equal number of hats and coats, so that upon one of the units illustrated in Figure 1 forty-eight coats and hats can be placed. Upon the outermost member 38 on the lower shelf is provided a row of hooks 44, 44, having a removable check 45 positioned thereon, the check 45 being illustrated in elevation in Figure 3, each of said hooks being positioned immediately adjacent one of the notches in the hanger support members. Attached to the outer edge of the member 38 is a plate 46 illustrated in detail in Figure 5, the said plate 46 and the check 45 corresponding in number, which for purposes of illustration is shown in the drawing as number 12. When a customer checks his coat it is placed upon a hanger which is placed in one of the notches 37, which it will be noted are immediately adjacent one of the hooks 44, the check 45 is removed from the hook and given to the customer, and his hat is placed in corresponding numbered compartment on one of the upper shelves, and which it will be noted is numbered by the plates 46, 46 being positioned thereon at the proper places, these numbers corresponding to numbers of the hooks 44 and checks 45, so that when a coat is checked the hanger containing the coat is placed in the proper notch in one of the bars 37 and the hat is placed in the corresponding numbered compartment above. A plurality of bars 47, 47 are provided which divides each of the hat shelves longitudinally and forms a part of the hat receiving compartment on each shelf.

In operation of the device it is understood that for shipping purposes and the like the vertical units are built in the shop and shipped in knocked-down condition, so that when the racks are set up it is only necessary to put the upper shelves in the proper position and to put the bottom braces 23 and 24 in place together with the diagonally extending braces 28 and 29, when the rack can be set up and used very quickly; and also for shipping purposes very little space is needed either for shipment or for storage purposes.

Though a preferred embodiment of the present invention has been described in detail, it will be clear that many modifications may be made without departing from the scope of the invention. It is intended to cover all such modifications that fall within the scope of the invention as defined by the appended claim.

I claim:

A combined coat and hat rack comprising in combination a supporting frame, a pair of longitudinally extending coat supporting rails carried by said frame and having notches in the upper sides thereof adapted to receive the hooks of coat hangers, a plurality of hat supporting shelves carried by said frame, a dividing member extending longitudinally of said shelves and a plurality of transverse dividing members on said shelves, said members dividing the shelves into compartments, the compartments being so related to the notched rails that a compartment corresponding to each notch is located above said notch, and hooks positioned adjacent said notches, said hooks being adapted to removably hold identifying indicia.

Signed at Chicago, Illinois, this 19th day of August, 1925.

GEORGE PETERSON.